Feb. 15, 1944.  P. W. SLOAN  2,341,883
CONVERTIBLE VEHICLE
Filed July 13, 1940  6 Sheets-Sheet 2
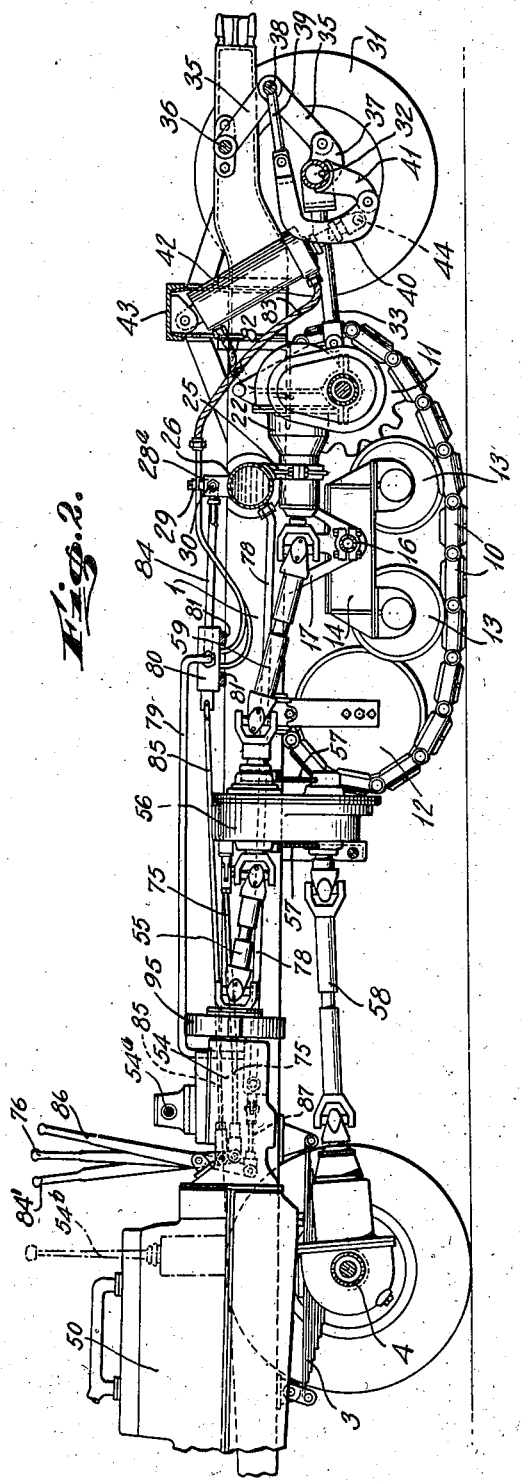
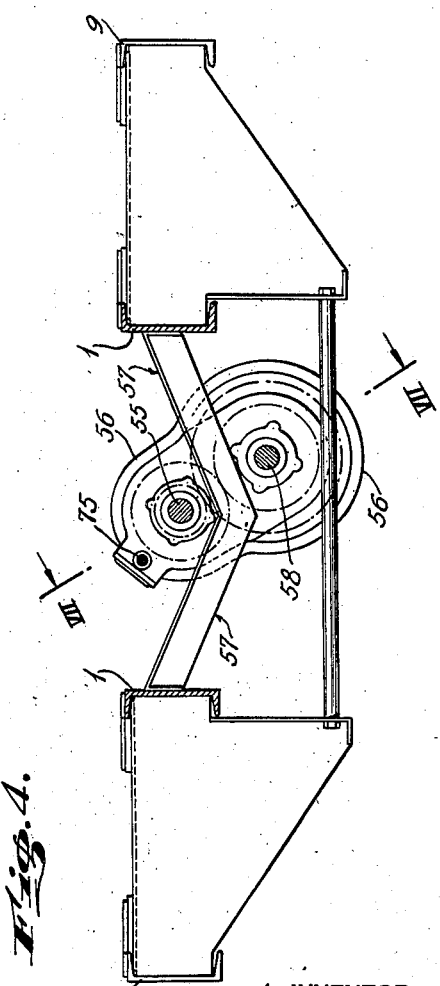
INVENTOR
Philip W. Sloan
BY
ATTORNEYS

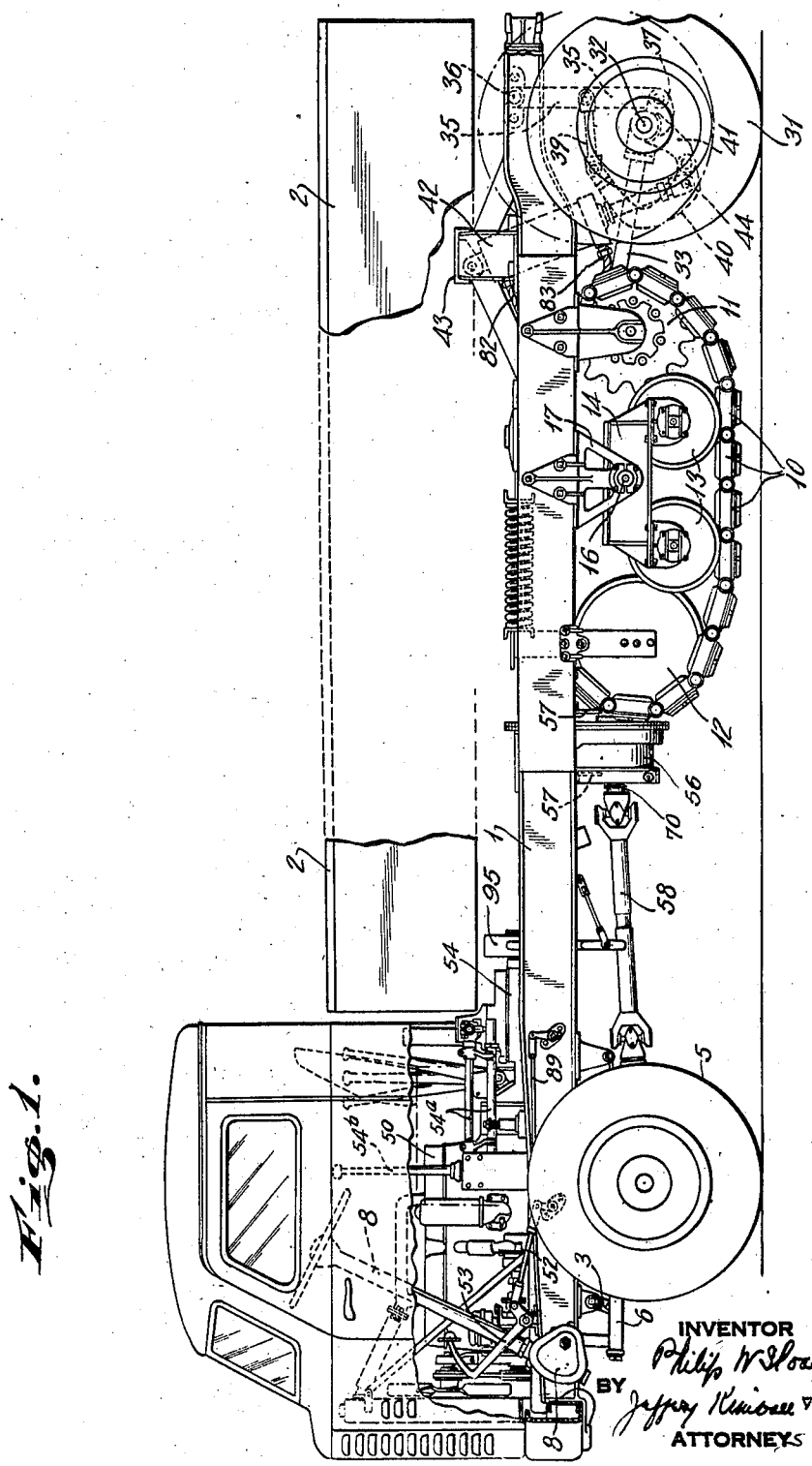

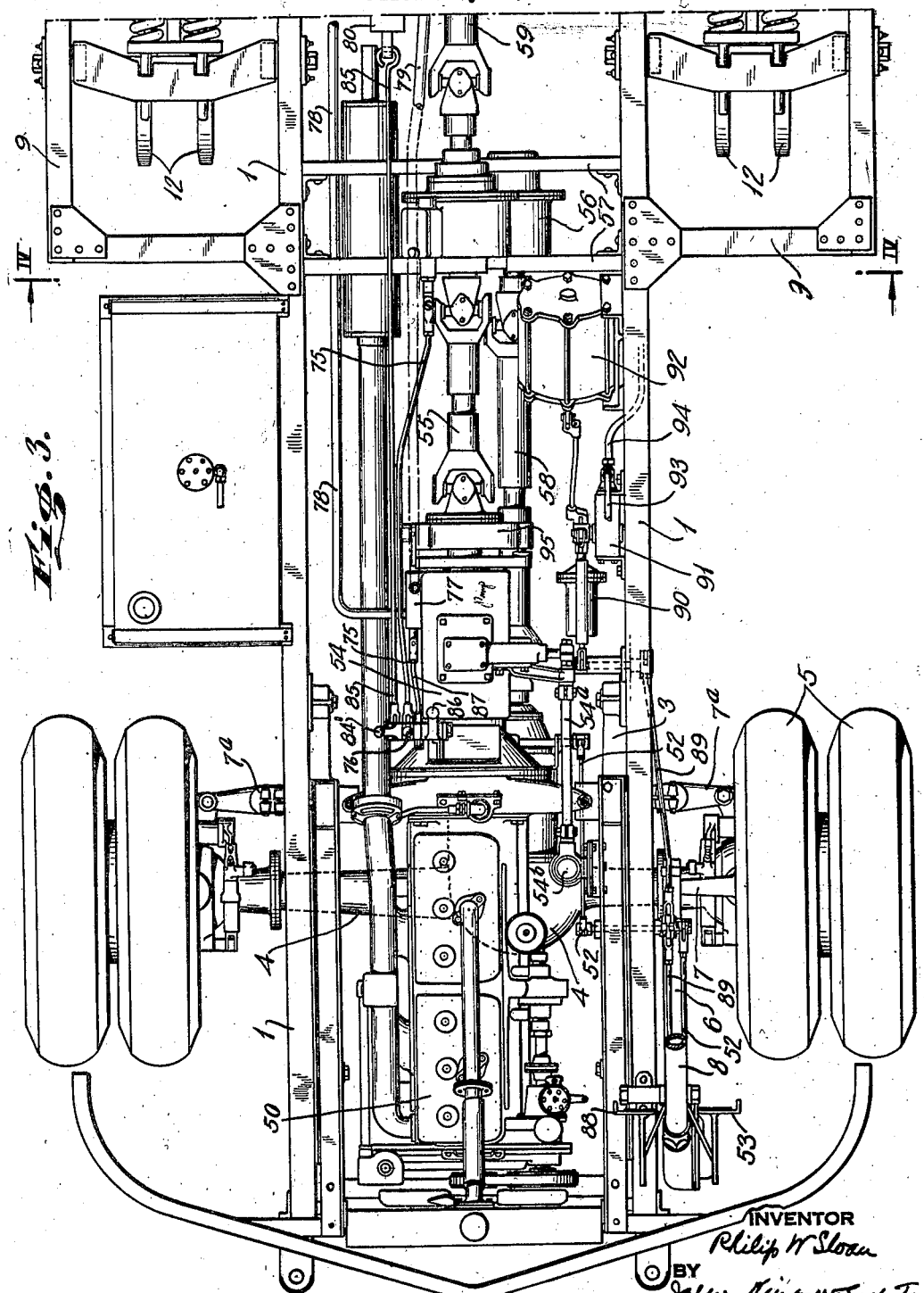

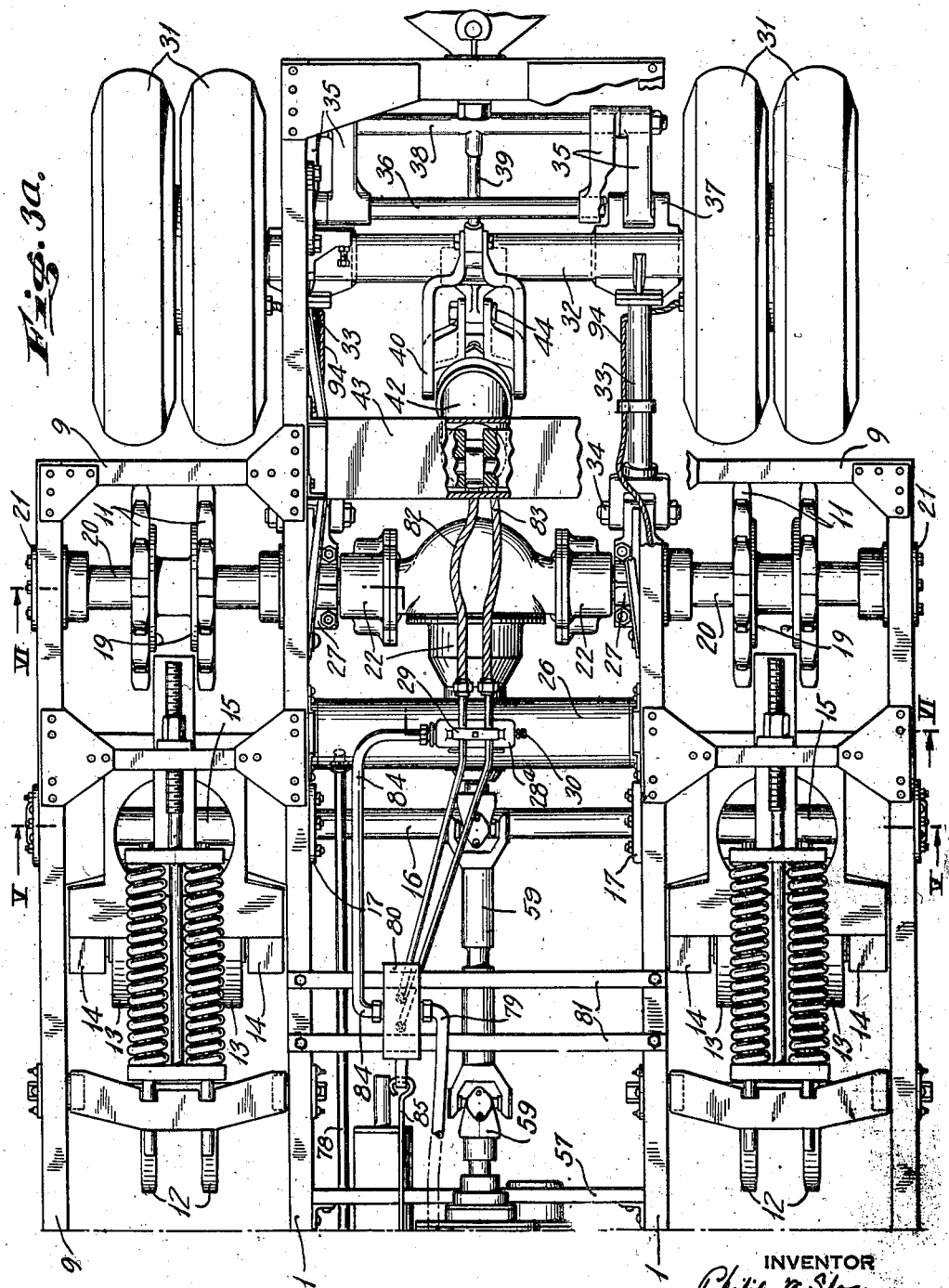

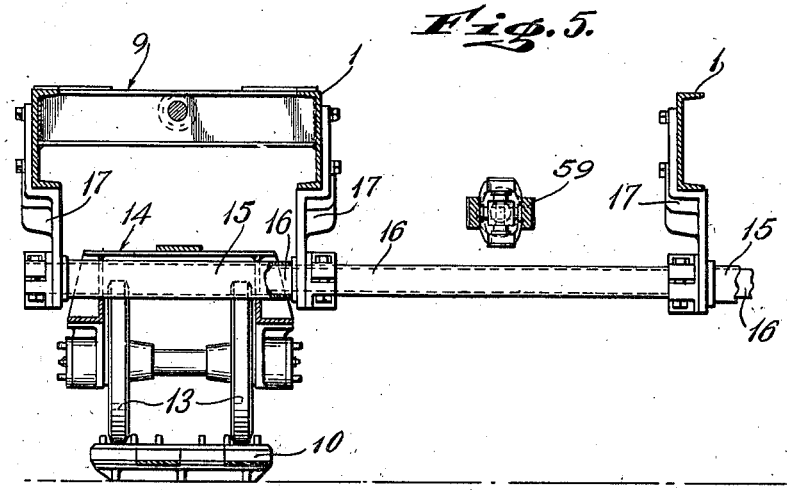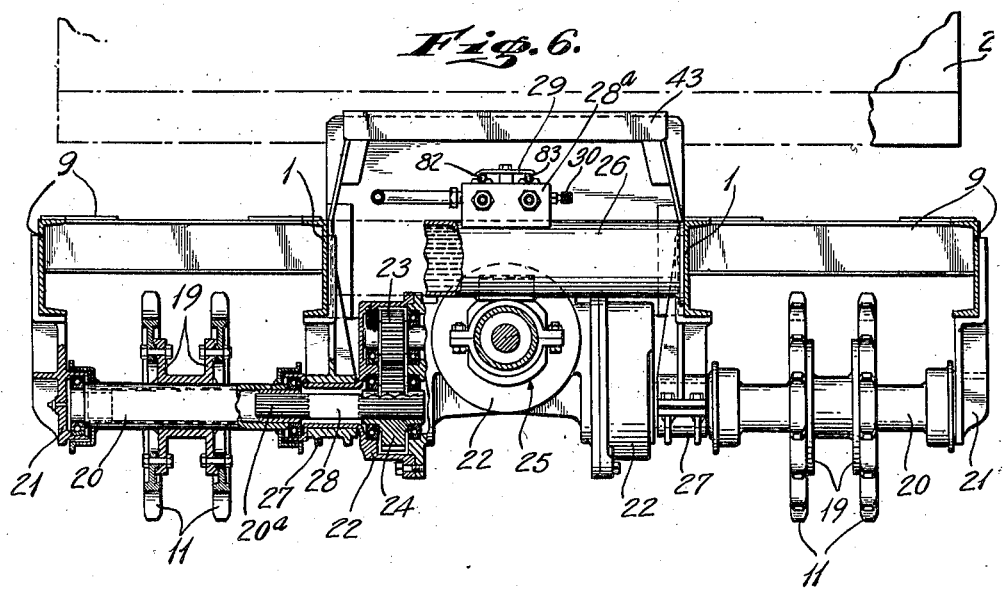

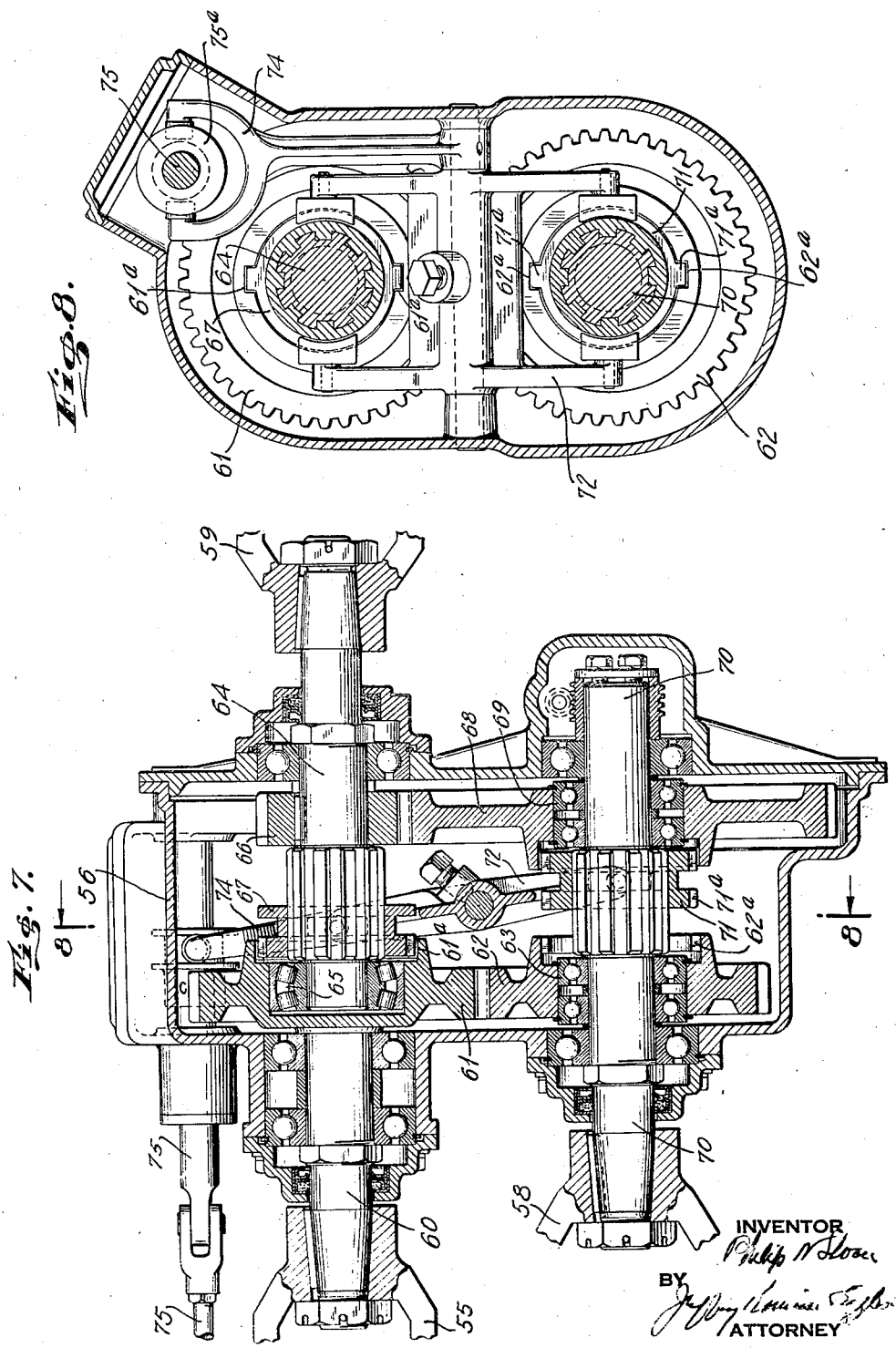

Patented Feb. 15, 1944

2,341,883

UNITED STATES PATENT OFFICE 2,341,883

CONVERTIBLE VEHICLE

Philip W. Sloan, Cleveland, Ohio, assignor to Linn Manufacturing Corporation, Morris, N. Y., a corporation of New York Application July 13, 1940, Serial No. 345,380

10 Claims. (Cl. 180—9.1)

This invention relates to motor vehicles which are convertible from crawler type to wheel-type and comprises a new organization of wheels and crawler mechanism permitting rapid conversion from one type to the other and in each type providing a practical and highly efficient motor vehicle, particularly in the crawler-type in which it affords better traction and greater maneuverability than has been hitherto possible in convertible vehicles.

In the drawings which exemplify the general principles and special features of the new organization, Fig. 1 is a side elevation of the vehicle partly broken out;

Fig. 2 is a similar elevation partly in section;

Fig. 3 is a larger scale plan of the front part of the chassis;

Fig. 3a the rear part;

Fig. 4 a section on line IV—IV of Fig. 3;

Fig. 5 a partial section on line V—V of Fig. 3a;

Fig. 6 a section on line VI—VI of Fig. 3a;

Fig. 7 an enlarged section on line VII—VII of Fig. 4; and

Fig. 8 a cross section of Fig. 7.

This vehicle comprises a main frame composed of side girders 1 carrying the propelling engine and driver's cab in front and any kind of a cargo body, indicated at 2, behind the cab. Commonly this is a dump-type body, hinged to a point at the rear of the frame and provided with a hydraulic cylinder or other power means, not shown, for raising the front end to dump, and as will be understood. The cab is mounted directly over the engine and both are approximately over or slightly forward of the front axle, which not only gives maximum room on the frame for the body in rear, but also by the weight of these parts, contributes in maintaining a constant minimum traction for the front road wheels, the importance of which in this particular organization will presently appear.

The load on the front end is transmitted through springs 3 and a front axle housing 4 to the front road wheels 5 which are shown as dual-tired pneumatic wheels, and serve for both steering and driving purposes. Their steering connections are shown as of usual design comprising the link connection 6 to the steering crank 7 and drag-link 7a, operated from the steering column 8. The axle housing 4, as its shape indicates, contains a conventional differential gear system driven from the engine by the drive-connections presently described and also carries the necessary connections for the front wheel brakes, parts of which appear in the drawings, being of the hydraulic type. As a convenience and economy of manufacture this front axle structure may be a duplicate of that used for the crawler drive and presently referred to, but neither embodies any novel feature on which account the detail has been omitted from the drawings.

The rear of the chassis frame has two alternate points of support which are brought into use, according to the work the vehicle is to do. One is constituted by a pair of track-laying units, herein termed crawlers, which carry the load when the vehicle is operating as a crawler-type. The other is a pair of rear road wheels, also dual-tired, located directly under the rear end of the chassis and under the body and adapted to be depressed so as to carry the load when the vehicle is operating as a wheeled truck. In the former condition the vehicle is adapted to travel over the roughest terrain at speeds of, say, 12 M. P. H., and as a fully-wheeled vehicle or truck it is adapted for higher speeds of, say, 35 M. P. H. on roads.

The crawler units are organized in the outrigger extensions 9 of the main frame and include the usual endless tracks composed of links or shoes 10 driven by drive sprockets 11 at the rear. These tracks are trained around yieldingly mounted take-up wheels 12 in front and pass under pairs of intermediate load wheels 13 which are the load-carrying members of the crawler units and support the load by the yokes 14 in which they are journaled, as shown in Figs. 1 and 5. The detail of the tracks or link members is not a part of this invention on which account they are omitted from some of the figures of the drawings.

Each of the yokes 14 is formed of flat sections of steel plate welded together and with a bearing tube 15 (Fig. 5) welded in perforations in its vertical side plates so as to make a unitary rigid structure, and each yoke is assembled with its bearing tube fitted on one of the ends of a tubular axle or rocker beam or axle 16 which is fixed to the chassis frame by the brackets 17 depending from the side girders and the outriggers respectively. Thus the chassis load is transmitted to the crawler units in such manner that each is free to rock independently of the others, and the crawler vehicle can thereby accommodate all manner of irregular ground surface. The lateral dimensions of the outrigger frames are such as to bring the centers of the crawler tracks slightly inboard of the front wheels, so that while they track the front wheels they do not exactly register with the ruts made by them in soft ground.

The rocker beam 16, which is the point of crawler support, is located substantially directly under the center of the cargo body, or only slightly to the rear thereof so that the crawlers carry most of the cargo load. The relative disposition of the driving front wheels and crawler units whereby the former derive their traction grip on the ground by virtue mainly of the weight of the cab and engine, and the crawlers derive their traction mainly from the weight of the cargo, exercises an important influence on the performance of the vehicle since it is part of the means which avoids the tendency for the crawlers to push or skid the front wheels out of their planes of rotation and thereby avoids the need for steering the crawlers by driving the right and left units at different speeds, as heretofore customary and necessary with wheel-bases as short as herein provided. With the arrangement described the wheel-base in the crawler form is 114 inches, and in the wheeled form 170 inches or 50% greater than the crawler form.

The crawler sprockets 11 which drive each track are twin sprockets bolted to hub flanges 19 (Fig. 6) welded to a tubular hub 20 which latter is journaled at its outer end in a hanger bracket 21 fixed to the outrigger frame 9 and at its inner end in the hub of the gear case 22, of the crawler drive axle.

This gear case is a so-called final-drive unit containing a differential gear system in its central part and reduction gears 23 and 24 in its side portions. It is supported at its forward end in a bracket 25 secured to the under side of the large cross-member 26 of the chassis frame, and at its rear it is clamped in sockets in the right and left brackets 27 on the side girders 1, thus having a three-point support to render it immune from the effects of distortion of the chassis frame under the stress of heavy work. The hubs 20 of the sprockets are multi-splined, internally and as indicated in Fig. 6, to fit corresponding splines 20a on the short jack-shafts 28 of the final drive unit so that the sprockets are easily removable as by pulling their hubs off of the jack shaft. Oil guards and seals are provided, as indicated, to retain the oil in the gear case from escaping through its hub and keep out dirt. The weight distribution already referred to supplemented by the differential drive of the two independently rockable crawler units, causes the latter to follow the steering angles of the front wheels naturally and without tendency to skid them which results in a superior degree of maneuverability in the softest ground.

The cross-member 26 which supports the front end of the gear casing 22, is constituted of a tube or cylinder of wide diameter approximately as wide as the side girders 1, and bolted to them by its end flanges, see Fig. 6, so as to form an exceptionally rigid cross-brace for the frame and one which is of equal strength in all directions. It is located close to or just in rear of the rocker 16 which is the point of crawler load support. But, forward of this point there are no frame cross-braces or other cross-connections of equivalent rigidity so that the part of the frame that is forward of the crawlers possesses considerable torsional flexibility. In rear of the stout crossbrace 26 the frame cross members, presently to be mentioned, are also stout, making the rear part of the frame relatively stiff and rigid as compared to the forward part. Under the short wheel-base condition, present when the vehicle is crawler-type, the torsional flexibility of the front part, then in service, is important for avoiding concentration of the total load on any one of the ground-engaging elements, such as might cause such element to sink unduly in soft ground or interfere with steering, whereas under the longer wheel-base condition, with the whole of the frame spanning the longer distance between front and rear wheels, a maximum stiffness of frame is necessary for safe road travel and is sufficiently provided by the cross-brace 26 and the other heavy cross connections in rear of it. The frame which is torsionally flexible in its front part and rigid to torsion in its rear part is thus made best adapted for each of its two conditions of use.

Advantage is taken of the wide diameter of the cross-member 26 to use its interior as a reservoir for the liquid or oil used for the operation of the hydraulic system. On its top it carries an oil manifold 28a carrying a pipe-holding clamp 29 for the distribution piping presently described. A bleed valve 30 is located at one end of the manifold to vent air from the interior.

The depressible rear wheels, which are non-driving or trailer wheels, are marked 31 and are independently journaled on an axle structure 32 rigidly carried in the rear ends of a pair of stay rods 33 the front ends of which are pivoted at 34 to the chassis frame girders just abaft the final drive casing 22 as, for example, to the brackets 27 in which the rear end of such casing is mounted. Thus connected, the rear wheels are directly behind the crawler units and can be swung in a vertical arc and such arc is long enough to raise the wheels about nine inches above the ground, when the load is carried on the crawler units, and to lower them to about the same distance below the units to cause the latter to be raised, say, about eight inches from the ground.

When the wheels are fully depressed the chassis load is transmitted to them through pairs of toggle links 35, in dead-center relation, one pair at each end of the axle. These links are ring-jointed at their upper ends to one of the rear cross-braces of the frame which in the present case is a round cross-bar 36 rigidly bolted to the frame as shown. At their lower ends the links are pivoted to the lugs 37 fast on the fitting which connects the axle 32 to the stay rods 33. The knuckle joint of the toggles is formed by a stout pintle 38 (Fig. 2) which is common to both pairs of toggles and thereby stiffens the wheel-support against side-sway, no springs being required or desirable for these wheels.

This pintle-bar is connected at its center by a link 39 to the long arm of an elbow-shaped lever 40, the other arm of which is pivoted to another lug 41 integrally or rigidly fastened to the axle housing 32. This elbow lever forms a differential coupler between the rear wheel axle and the toggles on the one hand and the power operating means on the other. Such means in the present case is a hydraulic cylinder 42 pivoted at its upper end in the heavy box-type cross girder 43 rigidly attached to the side girders by angle irons as indicated. The piston rod is jointed to the elbow lever 40 at the intermediate point 44. The cross-girder 43 is one of the stiffeners for the rear part of the frame.

As thus arranged, and due to the proportion of the lever arms, the hydraulic force of the piston is transmitted in major value in the vertical direction for raising or depressing the rear axle, and in lesser value to the pintle-bar 38 of the toggles for moving that member substantially horizontally. Thus the force required for shifting the axle, which is a considerable force when the vehicle is loaded, is imparted by the substantially direct thrust of the piston and not through the toggles, which latter function mainly or only to lock the wheels down and thereafter to carry the load which they do independently of the hydraulic system. For this purpose they are designed to pass just beyond their dead center positions when straightened, so to constitute struts. When it is desired to raise the wheels, the initial upward movement of the piston first shifts the pintle-bar out of dead center thus unlocking the toggles, while the continued piston movement then lifts the axle directly. The hydraulic cylinder, being thus substantially a direct-acting power device, and housed in the box-type cross brace 43 is wholly below the cargo body and the trailer wheels which run in the same path as the crawler units are also beneath the body permitting the latter to be as wide as desired, with an unobstructed tail board.

Referring now to the propulsion system, the engine 50 is mounted over and somewhat forward of the front wheel axis, as stated, and the operator's seat indicated in dotted lines in Fig. 1 is set at the side of the engine, accessible to all the several controls. The engine will be understood to comprise all the usual engine adjuncts and accessories some of which appear in the drawings, including the usual clutch which is operated by the linkage designated generally by 52 from the clutch pedal 53. The power drive is from the clutch through a change-speed transmission 54 of customary design and conventionally represented in the drawings, gear shifting being done through the forwardly extended shift rods and connections 54ª by the shift lever 54ᵇ, at the side of rather than behind, the engine.

From the transmission 54 power is transmitted through the universal-jointed propeller shaft 55 (Fig. 2) to the power divider 56 which is supported in appropriate cross-traps 57 from the side girders 1. This divider is subject to manipulation by the driver to direct the driving power to the front wheels or jointly to the front wheels and crawler units, according as the vehicle is operated as a wheel tractor (rear wheels depressed), or as a crawler (rear wheels elevated).

It is constructed as follows and as shown in Figs. 7 and 8. Its live shaft 60 which is driven by the propeller shaft 55, is journaled in the forward wall of the divider casing and carries integrally thereon, within the casing, a spur pinion 61 which is in constant mesh with and drives the gear 62 which latter is idly mounted on the ball-bearings 63. When the engine clutch is closed and the change-speed transmission 54 is set in other than neutral, the pinion 61 and gear 62 are maintained in rotation. The live shaft 60 is aligned with a second shaft 64, one end of which is journaled in the rear wall of the casing 56 and the other in the bearing 65 inside the hub of pinion 61. This shaft drives the crawler units. It carries keyed to it the pinion 66 and a clutch collar 67 which is multi-splined to it. This collar is adapted to be shifted along its splines (left in Fig. 7) into clutching engagement with the pinion 61, thus to transmit power from latter and live shaft 60 to the shaft 64 and its pinion 66. The collar has clutch teeth to engage notches in the pinion 61 as indicated at 61ª in Fig. 8, thus forming the clutching connection. The pinion 66 drives the gear 68 idly journaled on the ball-bearing 69. The bearing of this gear and the bearing 63 of gear 62 are concentric with and supported on a countershaft 70 on which a clutch collar 71 is splined, adapted to be shifted into clutching engagement with either gear 62 or 68, thus to drive the countershaft 70 from either of these gears. This clutch engagement between collar 71 and its gears is by means of its clutch teeth 71ª engaging corresponding notches in the faces of the gears. Due to the difference in gear diameters the gear train 61—62 drives the countershaft 70 faster than the gear train 66—67, and such countershaft 70 is connected to the front drive propeller shaft 58, and is the means by which the front wheels are driven. Clutch collars 67 and 71 are shifted by a rocker fork 72 centrally fulcrumed in casing 56 and operated by a crank arm 74 from the collar 75ª of shifter rod 75, which is connected by linkage also marked 75 to hand lever 76 in the cab.

When the clutch collar 67 is in its mid or neutral position, it is unlocked from pinion 61 and the clutch 71 is also in its neutral position unlocked from both its gears (62 and 68) so that no power can be transmitted by the power divider. When the hand lever 76 is adjusted to engage the clutch collar 71 with the gear 62, the mechanism is set to transmit driving power to the countershaft 70 and the front propeller shaft 58, thus driving only the front wheels and driving them through the high speed train (61—62). When the clutch collars are reversed to their opposite positions, as by moving the hand lever 76 in the opposite direction, the collars take the positions shown in Fig. 7, the clutch 67 being engaged with live pinion 61 and clutch collar 71 with gear 68. The power will then be divided from the pinion 61, part passing by the crawler-drive-shaft 64 to the crawler units and part passing through slow speed gear train 66—68 to the countershaft 70 and front wheels. The train 66—68 is so related to the crawlers as to drive the crawler tracks and front wheels at the same surface speed.

The hydraulic operating system for depressing and lifting the trailer axle is operated from an oil pump built into the change-speed transmission 54 and which takes oil by pipe line 78 from the cross-brace reservoir 26 and delivers it by pipe line 79 to a control valve 80, shown as mounted on cross-straps 81. In one setting of valve 80 oil is directed to the pipe line 82 leading through a flexible section to the top of the hydraulic cylinder 42, and in another setting through flexible line 83 to the opposite end of the cylinder, with a return flow to the reservoir 26 provided by the pipe 84. The control valve is operated by a hand lever 84' in the cab connected to it by link 85 or in any suitable way.

It will be understood that the oil pump 77 is driven from one of the gears in the transmission case 54 being connectible thereto as required. This does not appear in the drawings, because well understood in dump vehicles, except that the control handle 86 appears in Fig. 3 connected to the pump by the linkage 87. Since these pumps cannot be put into engagement with the interior transmission gear until the latter is at rest, it follows that the engine clutch must be open, or the transmission in neutral, and the vehicle also at rest, before either the trailer wheels or the crawlers can be lifted from the ground, thus necessitating a complete stop before converting from one type to the other and avoiding the risk of accident likely to ensue if this were otherwise. Also it may be noted that by virtue of the action of the long arm of the elbow lever 40 in closing the toggles to or slightly beyond dead center, the pump pressure is not relied on to hold the wheels depressed and under load. This constitutes an automatic locking device insuring a high degree of safety.

While the braking system forms no part of the invention parts of a conventional hydraulic system appear in the drawings being indicated at 89, 90 and 91, with a vacuum booster 92. It will suffice to say that all four wheels are provided with brakes, pressure fluid being led thereto by flexible tubes 93 and 94. For the trailer wheels these tubes follow the stay rods 33 being clamped to them as indicated in Fig. 3a. In addition to the hydraulic system an emergency brake is provided on the power line and appears at 95, its operating linkage being omitted.

I claim:

1. In a convertible motor vehicle, the combination of a frame carrying its propelling engine at one end and having road wheels at both ends, the front road wheels being steering-driving wheels and the rear wheels being depressible, crawler units intermediate of the front and rear wheels, a power divider selectively operable for connecting the engine to drive the forward wheels and crawler units jointly, or said forward wheels alone, and means for depressing the rear wheels to cause them to support said units whereby the vehicle may then be driven by the front wheels only.

2. In a convertible motor vehicle having a road engaging member adapted to be depressed to take the load from another road-engaging member of the vehicle, a device for locking said depressed member in its depressed position, a power means for depressing said member and a separate operating connection extending from said power means for actuating said locking device.

3. In a convertible motor vehicle, the combination of front and rear road wheels and intermediate crawler units, and means for depressing the road wheels at one end to raise the units comprising hydraulic means having one connection with said wheels for vertically moving them and another connection for locking them in or unlocking them from their load-carrying position.

4. A convertible motor vehicle comprising a torsionally flexible frame composed of side girders supported on front road wheels and depressible rear road wheels and including lateral outrigger extensions on said girders intermediate of said wheels, crawler units under said extensions, rocker bearings connecting the units to said extensions, a cab and engine mounted on the frame approximately centered over the front wheels, a cargo body mounted on said frame overlying said extensions and said rear wheels, being approximately centered over said rocker bearings, in combination with a power line from the engine including a selectively operable power-divider, said divider including a gear train adapted for driving said front wheels alone when the rear wheels have been depressed, and another train adapted for jointly driving said front wheels and said units when said rear wheels have been elevated and means for depressing the rear wheels to lift the crawler units from the ground.

5. A convertible wheel-crawler, motor vehicle comprising a frame with a cargo body thereon supported permanently on a front differential drive axle having steering-driving road wheels, and adapted to be supported temporarily on rear, depressible, non-driving road wheels, crawler units having rocker bearings fixed to said frame intermediate of said front and rear wheels adapted for temporarily supporting said frame on said units, when not supported on said rear wheels and having a differential drive axle for driving said units, a propelling engine controllable from the driver's station, a power transmission line extending from said engine to both said axles for driving the same and including a coupling for driving said front axle alone, as when the rear wheels are depressed, and a coupling for jointly driving both axles, as when said rear wheels are not depressed, and means operated from said station for rendering either of said couplings operative to the exclusion of the other, and another coupling means for said line adapted for connecting said line to means for depressing said rear wheels to lift the crawler units from the ground.

6. A convertible wheel-crawler motor vehicle comprising a frame permanently supported on front steering-driving road wheels and adapted to be temporarily supported on rear depressible non-driving road wheels, and adapted also to be temporarily supported on crawler units connected in fixed relation to said frame intermediate of said front and rear wheels, operating mechanism for said rear wheels adapted to raise them clear of the ground when the frame is supported on said units and to depress them so as to raise the units clear of the ground, said frame carrying a propelling engine at its forward end and a cargo body in rear thereof extending over said rear wheels whereby such body can discharge its load from above such wheels in any position of the latter, said engine having a power transmission line including means for alternatively driving either said front wheels alone, as when the rear wheels are depressed, or said front wheels and said units jointly, as when said rear wheels are not depressed, and including means for actuating said rear wheel operating mechanism in both directions.

7. A convertible wheel-crawler motor work vehicle comprising a frame and cargo body permanently supported on front steering-driving road wheels and adapted to be supported on rear depressible non-driving road wheels, and adapted also to be supported on crawler units connected by rocker-bearings to said frame intermediate of said wheels, a power cylinder for depressing said rear wheels to raise said units from the ground, a propelling engine mounted on the frame having a power transmission line therefrom including a selectively operable power-divider adapted for alternate adjustment for either driving said front wheels alone, as when the rear wheels are depressed, or for jointly driving said front wheels and said units, as when said rear wheels are not depressed, and pump mechanism conectible to said transmission line between said engine and divider adapted to be driven thereby for transmitting pressure to said cylinder, said vehicle having a driver's station and said engine, divider and pump mechanism being all provided with operating connections with control levers located at said station.

8. A convertible wheel-crawler work-vehicle comprising a vehicle frame supported on front steering wheels, which are also driving wheels, and adapted to be supported on rear, non-driving road wheels which wheels are depressible with reference to said frame and adapted to be lifted from the ground, and crawler units intermediate of said front and rear wheels, said units comprising crawler frames each having a rocker-type bearing connecting it to opposite points on said vehicle frame for supporting the same independently of said rear wheels, the part of said vehicle frame forward of said rocker-bearing points being only lightly cross-braced to permit torsional flexure to occur therein between said driving wheels and said rocker-bearing points, as when the latter are supporting the load, and the part of said frame between said points and the points at which it rests on the depressed rear wheels being more rigidly cross-braced to resist torsional flexure, whereby the torsional flexibility of the length of the frame that extends between front wheels and rear wheels, is not substantially greater than its shorter length that extends between front wheels and crawler units, said vehicle having a cargo body and propelling engine mutually so disposed on said vehicle frame as to impose at all times a traction-producing load on said front wheels adequate for driving and steering purposes.

9. A convertible wheel-crawler work-vehicle comprising a vehicle frame supported on front steering wheels which are also driving wheels, and adapted to be supported on rear non-driving road wheels which latter are depressible with reference to said frame, non-depressible crawler units intermediate of said front and rear wheels, said units comprising crawler frames each having a rocker-type bearing connecting it to said vehicle frame for supporting the same independently of said rear wheels when the latter are not depressed, a differential axle structure forming the load transmitting connection between said frame and said front driving wheels, a second differential axle structure between and driving said crawler units, a propelling engine having a transmission line, power divider mechanism in said line, and means at the driver's station for adjusting said divider mechanism to transmit driving power to said front axle structure only or to said structure jointly with said second differential axial structure, said vehicle having a cargo body and its propelling engine mutually so disposed on said vehicle frame as to impose at all times a traction-producing load on front wheels adequate for steering and driving purposes.

10. A convertible wheel-crawler work-vehicle comprising a frame supported on front steering wheels, which are also driving wheels, and adapted to be supported on rear non-driving road wheels which are depressible with reference to said frame and adapted to be lifted from the ground, non-depressible crawler units intermediate of said front and rear wheels, said units comprising crawler frames each having a rocker-type bearing connecting it to said vehicle frame for supporting the same independently of said rear wheels when the latter are lifted, a differential axle structure forming the load-supporting connection between said frame and front wheels, a second differential axle structure forming a non-load-supporting drive for said crawler units, a propelling engine having a power transmission line, power divider mechanism for said line means at the driver's station for adjusting said mechanism to transmit power alternatively to said load-supporting axle or jointly to both said axles, and means also operated from said transmission line for raising and depressing said non-driving wheels, said vehicle having its cargo body and propelling engine so disposed on the vehicle frame as to impose at all times a traction-producing load on said front wheels adequate for steering and driving purposes.

PHILIP W. SLOAN.